US012325809B2

(12) United States Patent
Choi et al.

(10) Patent No.: US 12,325,809 B2
(45) Date of Patent: Jun. 10, 2025

(54) COMPOSITION FOR SURFACE TREATING OF STEEL SHEET, STEEL SHEET USING SAME, AND MANUFACTURING METHOD OF SAME

(71) Applicants: POSCO, Pohang-si (KR); NOROO COIL COATINGS CO., LTD., Pohang-si (KR)

(72) Inventors: Chang-Hoon Choi, Gwangyang-si (KR); Won-Ho Son, Pohang-si (KR); Chan-Seok Bang, Pohang-si (KR); Jae-Duck Ko, Anyang-si (KR)

(73) Assignees: POSCO, Pohang-si (KR); NOROO COIL COATINGS CO., LTD., Pohang-si (KR)

(*) Notice: Subject to any disclaimer, the term of this patent is extended or adjusted under 35 U.S.C. 154(b) by 274 days.

(21) Appl. No.: 17/781,919

(22) PCT Filed: Dec. 3, 2020

(86) PCT No.: PCT/KR2020/017535
§ 371 (c)(1),
(2) Date: Jun. 2, 2022

(87) PCT Pub. No.: WO2021/112583
PCT Pub. Date: Jun. 10, 2021

(65) Prior Publication Data
US 2023/0019863 A1  Jan. 19, 2023

(30) Foreign Application Priority Data

Dec. 3, 2019 (KR) .................. 10-2019-0158976

(51) Int. Cl.
| | | |
|---|---|---|
| *C09D 7/61* | (2018.01) | |
| *B05D 7/14* | (2006.01) | |
| *C08K 3/36* | (2006.01) | |
| *C09D 4/00* | (2006.01) | |
| *C09D 5/08* | (2006.01) | |
| *C09D 7/20* | (2018.01) | |
| *C09D 7/40* | (2018.01) | |
| *C09D 7/63* | (2018.01) | |
| *C09D 183/06* | (2006.01) | |

(52) U.S. Cl.
CPC .............. *C09D 7/61* (2018.01); *B05D 7/14* (2013.01); *C09D 4/00* (2013.01); *C09D 5/08* (2013.01); *C09D 7/20* (2018.01); *C09D 7/63* (2018.01); *C09D 7/67* (2018.01); *C09D 183/06* (2013.01); *B05D 2202/10* (2013.01); *C08K 3/36* (2013.01); *C08K 2201/005* (2013.01)

(58) Field of Classification Search
CPC .......... C08K 3/36; C08L 83/04; C08L 83/06; C09D 183/04; C09D 183/06; C09D 5/12
See application file for complete search history.

(56) References Cited

U.S. PATENT DOCUMENTS

| | | | |
|---|---|---|---|
| 6,989,419 B2 | 1/2006 | Nixon | |
| 2002/0148538 A1 | 10/2002 | Yoon et al. | |
| 2006/0099429 A1 | 5/2006 | Domes et al. | |
| 2010/0297357 A1 | 11/2010 | Mowrer et al. | |
| 2015/0133576 A1* | 5/2015 | Croutxe-Barghorn | ... C09D 4/00 522/15 |
| 2016/0215361 A1 | 7/2016 | Yoon et al. | |
| 2019/0071781 A1 | 3/2019 | Murahashi et al. | |
| 2020/0032080 A1 | 1/2020 | Choi et al. | |
| 2020/0207992 A1* | 7/2020 | Jana | ..................... B05D 3/0254 |

FOREIGN PATENT DOCUMENTS

| | | |
|---|---|---|
| CN | 101705484 A | 5/2010 |
| CN | 102439100 A | 5/2012 |
| CN | 108026409 A | 5/2018 |
| CN | 109790402 A | 5/2019 |
| EP | 3521381 A2 | 8/2019 |
| EP | 3730672 A1 | 10/2020 |
| JP | 2006-519308 A | 8/2006 |
| JP | 2014-173020 A | 9/2014 |
| KR | 10-2001-0109931 A | 12/2001 |
| KR | 10-2003-0047469 A | 6/2003 |
| KR | 10-2003-0047470 A | 6/2003 |
| KR | 10-0775311 B1 | 11/2007 |
| KR | 10-2008-0046114 A | 5/2008 |

(Continued)

OTHER PUBLICATIONS

Chinese Office Action dated Sep. 6, 2021 issued in Chinese Patent Application No. 202080084006.5.
Office Action issued Jun. 27, 2023 for corresponding Japanese Patent Application No. 2022-532728.
Chinese Office Action dated Feb. 23, 2023 issued in Chinese Patent Application No. 202080084006.5.
Extended European Search Report dated Jan. 3, 2023 issued in European Patent Application No. 20896332.2.

(Continued)

*Primary Examiner* — Monique R Jackson
(74) *Attorney, Agent, or Firm* — Morgan Lewis & Bockius LLP

(57) ABSTRACT

The present disclosure provides a solution composition having excellent acid corrosion resistance and adhesion to a steel sheet, a steel sheet surface-treated using the solution composition, and a method for manufacturing the steel sheet. Specifically, the present disclosure provides a solution composition for treating a surface of a steel sheet, the solution composition containing colloidal silica, alkoxy silane, a solvent, an acidity regulator, an acrylate-based monomer, an adhesion improver including a backbone formed of siloxane bonds, and a metal chelate curing agent, a steel sheet surface-treated using the solution composition, and a method for manufacturing the steel sheet.

12 Claims, 1 Drawing Sheet

(56) References Cited

FOREIGN PATENT DOCUMENTS

| KR | 10-2010-0105104 A | 9/2010 |
|---|---|---|
| KR | 10-2010-0129996 A | 12/2010 |
| KR | 10-2012-0011258 A | 2/2012 |
| KR | 10-2012-0011259 A | 2/2012 |
| KR | 10-2012-0032886 A | 4/2012 |
| KR | 10-2012-0032887 A | 4/2012 |
| KR | 10-2013-0022874 A | 3/2013 |
| KR | 10-2013-0143374 A | 12/2013 |
| KR | 10-2013-0143375 A | 12/2013 |
| KR | 10-2014-0137942 A | 12/2014 |
| KR | 10-2015-0029468 A | 3/2015 |
| KR | 10-2015-0049503 A | 5/2015 |
| KR | 10-2015-0057815 A | 5/2015 |
| KR | 10-2015-0062176 A | 6/2015 |
| KR | 10-2015-0066333 A | 6/2015 |
| KR | 10-2016-0067278 A | 6/2016 |
| KR | 10-2016-0071219 A | 6/2016 |
| KR | 10-2018-0035283 A | 4/2018 |
| KR | 10-2018-0135514 A | 12/2018 |
| KR | 10-2019-0076099 A | 7/2019 |
| WO | 2010/070728 A1 | 6/2010 |
| WO | 2017/163446 A1 | 9/2017 |

OTHER PUBLICATIONS

International Search Report dated Mar. 22, 2021 issued in International Patent Application No. PCT/KR2020/017535 (with English translation).
Chinese Office Action dated Feb. 23, 2023 issued in Chinese Patent Application No. 202080084006.5 (with English translation).

\* cited by examiner

[Fig. 1]
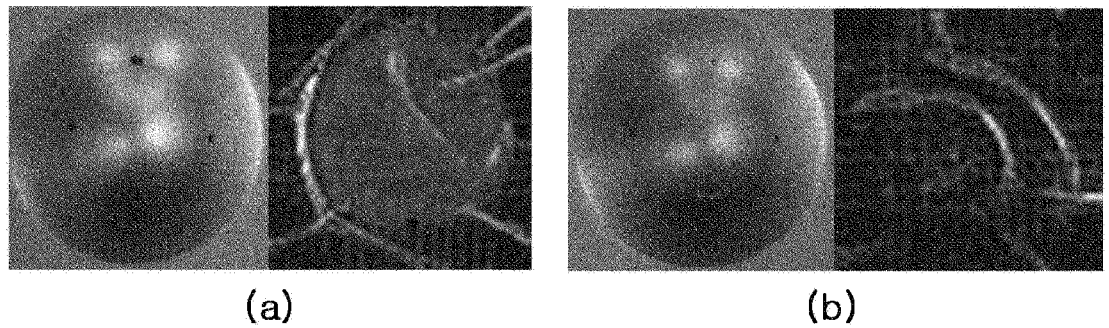
(a)　　　　　　　　　　　　(b)
[Fig. 2]
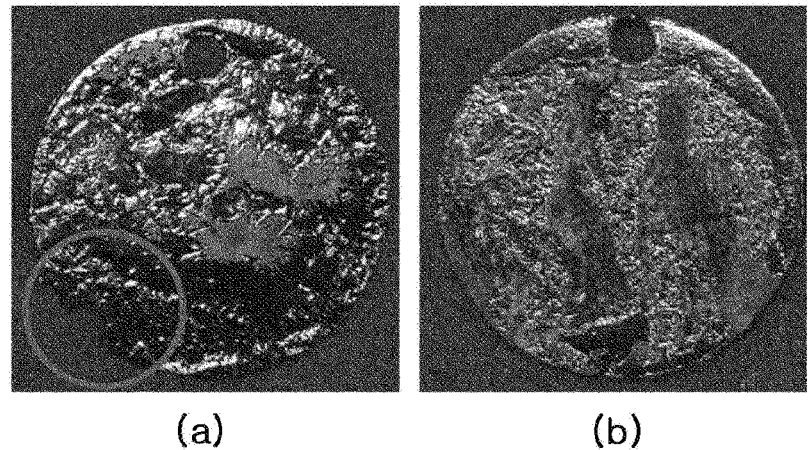
(a)　　　　　　　　　　　　(b)
[Fig. 3]
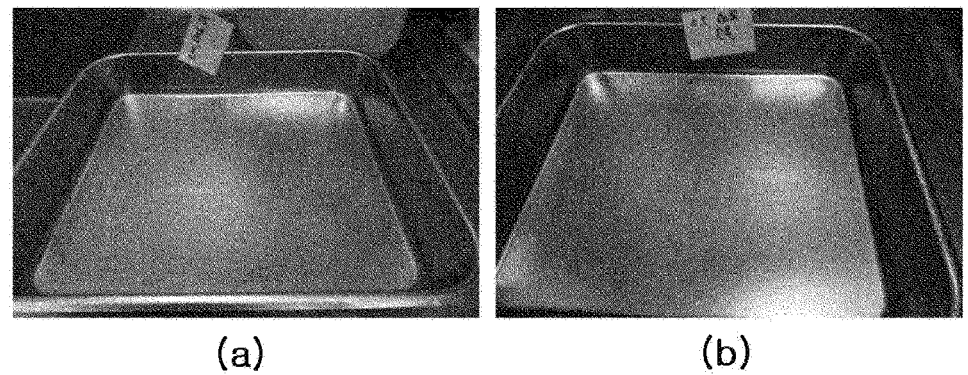
(a)　　　　　　　　　　　　(b)

COMPOSITION FOR SURFACE TREATING OF STEEL SHEET, STEEL SHEET USING SAME, AND MANUFACTURING METHOD OF SAME

CROSS-REFERENCE OF RELATED APPLICATIONS

This application is the U.S. National Phase under 35 U.S.C. § 371 of International Patent Application No. PCT/KR2020/017535, filed on Dec. 3, 2020, which in turn claims the benefit of Korean Application No. 10-2019-0158976, filed on Dec. 3, 2019, the entire disclosures of which applications are incorporated by reference herein.

TECHNICAL FIELD

The present disclosure relates to a solution composition having increased corrosion resistance to an acid and increased adhesion to a steel sheet, a steel sheet manufactured using the solution composition, and a method for manufacturing the steel sheet.

BACKGROUND ART

In general, in a case in which a fuel containing sulfur and the like is burned, sulfur oxides, nitrogen oxides, and the like are generated, and when sulfur oxides, nitrogen oxides, and the like react with water, strong acids such as sulfuric acid and nitric acid are generated. Such strong acids may adhere to a surface of a structure such as a metal at a temperature lower than a dew point, and dew point corrosion that promotes corrosion may proceed. Therefore, facilities such as a heat exchanger and a duct of a thermal power station are exposed to a corrosive environment caused by such strong acids.

In order to reduce such dew point corrosion, relevant companies have used an expensive stainless steel or enamel steel sheet, or have applied a sulfuric acid-resistant steel or the like that is relatively inexpensive and is highly resistant to dew point corrosion. A corrosion reaction proceeds on the surface of the structure, and most materials except for the enamel steel sheet have been used without an additional coating layer on the surface thereof.

Techniques for preventing dew point corrosion are disclosed in Korean Patent Application Nos. 2013-0151739, 2013-0145717, 2013-0141627, 2013-0130161, and the like. However, all such techniques are intended to improve corrosion resistance to strong acids through component adjustment of the steel sheet itself and the like, and are different from the technique of suppressing dew point corrosion by forming a coating layer on the surface of the steel sheet.

DISCLOSURE

Technical Problem

The present disclosure is intended to prevent dew point corrosion and improve corrosion resistance to strong acids through coating of a surface of a steel sheet rather than through component adjustment of the steel sheet itself, and is to provide a solution composition having excellent solution stability, and in particular, to provide a coated steel sheet in which a coating layer is not peeled off in a coating process.

Technical Solution

According to an aspect of the present disclosure, a solution composition for treating a surface of a steel sheet contains: 15 to 50 wt % of colloidal silica; 20 to 60 wt % of alkoxy silane; 1 to 40 wt % of a solvent; 0.01 to 1.00 wt % of an acidity regulator; 5 to 15 wt % of an acrylate-based monomer; 5 to 50 wt % of an adhesion improver including a backbone formed of siloxane bonds; and 0.1 to 3.0 wt % of a metal chelate curing agent.

According to another aspect of the present disclosure, a method for manufacturing a surface-treated steel sheet includes: providing a steel sheet; subjecting at least one surface of the steel sheet to a treatment with the solution composition of the present disclosure; and subjecting the steel sheet treated with the composition to a heat treatment.

According to still another aspect of the present disclosure, a surface-treated steel sheet includes: a steel sheet; and a coating layer formed of the solution composition of the present disclosure, the coating layer being formed on at least one surface of the steel sheet.

Advantageous Effects

As set forth above, according to the present disclosure, a solution composition having excellent solution stability may be provided, and a steel sheet having excellent acid corrosion resistance may be provided by coating the solution composition on the steel sheet. Furthermore, a surface-treated steel sheet that prevents peeling even during a working process of the steel sheet, and in particular, has excellent adhesion of a coating layer to the steel sheet, even during a process of washing a coating film with water, may be provided.

DESCRIPTION OF DRAWINGS

FIG. 1 illustrates a specimen in which a coating film is peeled off due to insufficient adhesion and tape (left side, Comparative Manufacturing Example 13) and a specimen in which a coating film is hardly peeled off and tape (right side, Manufacturing Example 4) at the time of cross-cutting, Erichsen working, and peeling of the tape in a working adhesion evaluation.

FIG. 2 illustrates a specimen whose corner is broken away due to local corrosion (left side, Comparative Manufacturing Example 9) and a specimen in a good condition (right side, Manufacturing Example 2) when measured in a corrosion resistance evaluation.

FIG. 3 illustrates washing water that is contaminated because peeling of the coating film occurs due to the washing water (left side, Comparative Manufacturing Example 15) and washing water that is clean because peeling of the coating film does not occur (right side, Manufacturing Example 2) when measured in a water cooling adhesion evaluation.

BEST MODE FOR INVENTION

Hereinafter, preferred exemplary embodiments in the present disclosure will be described with reference to the accompanying drawings. However, exemplary embodiments in the present disclosure may be modified in several other forms, and the scope of the present disclosure is not limited to exemplary embodiments to be described below.

A solution composition for treating a surface of a steel sheet of the present disclosure may contain colloidal silica, alkoxy silane, a solvent, an acidity regulator, an acrylate-based monomer, an adhesion improver including a backbone formed of siloxane bonds, and a metal chelate curing agent.

Specifically, the solution composition for treating a surface of a steel sheet may contain: 15 to 50 wt % of colloidal silica; 20 to 60 wt % of alkoxy silane; 1 to 40 wt % of a solvent; 0.01 to 1.00 wt % of an acidity regulator; 5 to 15 wt % of an acrylate-based monomer; 5 to 50 wt % of an adhesion improver including a backbone formed of siloxane bonds; and 0.1 to 3.0 wt % of a metal chelate curing agent.

Furthermore, the solution composition for treating a surface of a steel sheet may further contain an organic resin, and the organic resin may be contained in an amount of 0.1 to 5.0 wt %.

In order to prepare the solution composition for treating a surface of a steel sheet of the present disclosure, an intermediate may be formed through a sol-gel reaction by mixing trivalent alkoxy silane with colloidal silica of nanoparticles, an acrylate-based monomer may be additionally reacted with the intermediate to synthesize a main resin, and then, an organic resin may be additionally added.

In the solution composition for treating a surface of a steel sheet of the present disclosure, the colloidal silica of nanoparticles may contain particles having a particle size of preferably 5 nm to 50 nm. When the particle size of the colloidal silica is less than 5 nm, a raw material price is increased, but a hardness of a coating film is reduced, which causes deterioration of durability of the coating film. When the particle size of the colloidal silica is more than 50 nm, a specific surface area of the silica particles is decreased, which may cause deterioration of adhesion of the coating film, and the particle size is increased, which may cause deterioration of solution stability.

In the solution composition for treating a surface of a steel sheet of the present disclosure, the colloidal silica of nanoparticles may be contained in an amount of 15 wt % to 50 wt % with respect to 100 wt % of the solution composition for treating a surface of a steel sheet. When the content of the colloidal silica of nanoparticles is less than 15% with respect to 100 wt % of the solution composition for treating a surface of a steel sheet, the colloidal silica of nanoparticles may not sufficiently bind to the alkoxy silane, and thus, the hardness may be reduced and the corrosion resistance may not be secured. When the content of the colloidal silica of nanoparticles is more than 50 wt % with respect to 100 wt % of the solution composition for treating a surface of a steel sheet, silica that does not bind to silane may remain, and thus, formation of a coating film may be deteriorated. As a result, the corrosion resistance may not be secured.

In the solution composition for treating a surface of a steel sheet of the present disclosure, the alkoxy silane may be contained in an amount of 20 wt % to 60 wt % with respect to 100 wt % of the solution composition for treating a surface of a steel sheet. When the content of the silane mixture is less than 20 wt % with respect to 100 wt % of the solution composition for treating a surface of a steel sheet, the silane mixture may not sufficiently bind to the colloidal silica, and thus, a coating film may not be formed. As a result, the corrosion resistance may not be secured. When the content of the silane mixture is more than 60 wt % with respect to 100 wt % of the solution composition for treating a surface of a steel sheet, organic gas may be emitted due to thermal decomposition and a large amount of silanol may remain, and thus, adhesion of a coating film may be deteriorated. As a result, the corrosion resistance may not be secured.

In the solution composition for treating a surface of a steel sheet of the present disclosure, a specific type of the alkoxy silane is not particularly limited, and is preferably silane that has three or more alkoxy groups and may be stabilized after hydrolysis. The alkoxy silane may include one or more selected from the group consisting of vinyl trimethoxy silane, vinyl triethoxy silane, vinyl tri-isopropoxy silane, 3-methacryloxypropyl trimethoxy silane, 2-glycidyloxy propyltrimethoxy silane, 2-glycidyloxy propyltriethoxy silane, 2-aminopropyl triethoxy silane, 2-ureidoalkyl triethoxy silane, tetraethoxysilane, triethoxyphenylsilane, and trimethoxyphenylsilane.

In the solution composition for treating a surface of a steel sheet of the present disclosure, the solvent may serve to control compatibility and hydrolysis of silane with water, steel sheet surface wetting and a drying rate of the solution composition, and the like, and may be contained in an amount of 1 wt % to 40 wt % with respect to 100 wt % of the solution composition for treating a surface of a steel sheet. When the content of the solvent is less than 1 wt % with respect to 100 wt % of the solution composition for treating a surface of a steel sheet, compatibility may be deteriorated, and thus, storage stability of the solution composition (stability of the solution) may be deteriorated and corrosion resistance after coating may not be secured. When the content of the solvent is more than 40 wt % with respect to 100 wt % of the solution composition for treating a surface of a steel sheet, a viscosity is too low, and thus, the stability of the solution may be deteriorated and corrosion resistance after coating may not be secured.

In the solution composition for treating a surface of a steel sheet of the present disclosure, a specific type of the solvent is not particularly limited, and the solvent may preferably include one or more selected from the group consisting of methanol, ethanol, 2-propanol, 2-methoxypropanol, 2-butoxyethanol, water, dimethylformamide, diglyme, 2-aminoethanol, 1-heptanol, propylene glycol, dimethyl sulfoxide, ethylene glycol, diethylene glycol, glycerin, di(propylene glycol) methyl ether, diethylene glycol monomethyl ether, ethylene glycol mono-n-propyl ether, propylene glycol monomethyl ether, and propylene glycol monomethyl ether acetate.

In the solution composition for treating a surface of a steel sheet of the present disclosure, the acidity regulator serves to improve stability of the silane while helping the hydrolysis of the silane, and may be contained in an amount of 0.01 wt % to 1.00 wt % with respect to 100 wt % of the solution composition for treating a surface of a steel sheet. When the content of the acidity regulator is less than 0.01 wt % with respect to 100 wt % of the solution composition for treating a surface of a steel sheet, a hydrolysis time may be increased, and thus, the solution stability of the entire solution composition may be deteriorated. When the content of the acidity regulator is more than 1.00 wt % with respect to 100 wt % of the solution composition for treating a surface of a steel sheet, corrosion of the steel sheet may occur and a large amount of a resin having a low weight average molecular weight may be present, which may cause deterioration of the stability of the solution.

In the solution composition for treating a surface of a steel sheet of the present disclosure, a specific type of the acidity regulator is not particularly limited, and an organic acid, an inorganic acid, or a mixed acid thereof may be used as the acidity regulator. As the organic acid, for example, acetic acid, formic acid, lactic acid, gluconic acid, and the like may be used. As the inorganic acid, for example, sulfuric acid, nitric acid, hydrochloric acid, hydrofluoric acid, and the like may be used.

In the solution composition for treating a surface of a steel sheet of the present disclosure, the acrylate-based monomer serves to contribute to formation of a coating film during coating and a cross-linking reaction, and may be contained in an amount of 5 wt % to 15 wt % with respect to 100 wt % of the solution composition for treating a surface of a steel sheet. When the content of the acrylate-based monomer is less than 5 wt % with respect to 100 wt % of the solution composition for treating a surface of a steel sheet, the acrylate-based monomer may not sufficiently bind to silica and a synthetic silane polymer, and thus, formation of a coating film may be deteriorated. As a result, the corrosion resistance may not be secured. When the content of the acrylate-based monomer is more than 15 wt % with respect to the solution composition for treating a surface of a steel sheet, the water resistance may be reduced or the corrosion resistance may be reduced due to unreacted residual monomers.

In the solution composition for treating a surface of a steel sheet of the present disclosure, a specific type of the acrylate-based monomer is not particularly limited, and the acrylate-based monomer may preferably include at least one selected from the group consisting of acrylic acid glacial, methyl acrylate, ethyl acrylate, butyl acrylate, 2-ethylhexyl acrylate, isobutyl acrylate, tertiary-butyl acrylate, tertiary-butyl methacrylate, butanediol monoacrylate, lauryl acrylate, dimethylaminoethyl acrylate, and dihydrodicyclopentadienyl acrylate.

In the solution composition for treating a surface of a steel sheet of the present disclosure, the organic resin serves to improve adhesiveness to a material to be coated and to improve drying properties, and may be contained in an amount of 0.1 wt % to 5.0 wt % with respect to 100 wt % of the solution composition for treating a surface of a steel sheet. When the content of the organic resin is less than 0.1 wt % with respect to 100 wt % of the solution composition for treating a surface of a steel sheet, adhesiveness of the solution composition to a material to be coated may be deteriorated and the solution composition may not be easily dried, and thus, the corrosion resistance may not be secured. When the content of the organic resin is more than 5.0 wt % with respect to 100 wt % of the solution composition for treating a surface of a steel sheet, the water resistance may be deteriorated, and a peeling phenomenon of the coating film may occur.

In the solution composition for treating a surface of a steel sheet of the present disclosure, a specific type of the organic resin is not particularly limited, and the organic resin may preferably include at least one selected from the group consisting of polyvinyl alcohol, poly(meth)acrylic acid, a copolymer of acrylic acid and methacrylic acid, a copolymer of ethylene and an acrylic monomer (for example, (meth)acrylic acid, (meth)acrylate, or the like), a copolymer of ethylene and vinyl acetate, polyurethane, an amino-modified phenolic resin, a polyester resin, an epoxy resin, and a hybrid form obtained by mixing them.

In the solution composition for treating a surface of a steel sheet of the present disclosure, the adhesion improver serves to improve adhesion of a coating layer applied to the steel sheet, and may be contained in an amount of 5 wt % to 50 wt % with respect to 100 wt % of the solution composition for treating a surface of a steel sheet. When the content of the adhesion improver is less than 5 wt % with respect to 100 wt % of the solution composition for treating a surface of a steel sheet, the adhesion of the coating layer to the steel sheet may be insufficient, and thus, peeling of the coating film during a coil coating process may occur. When the content of the adhesion improver is more than 50 wt % with respect to 100 wt % of the solution composition for treating a surface of a steel sheet, organic components contained in the adhesion improver may be excessive, and thus, gas (fume) may be generated, which may cause deterioration of welding workability.

In the solution composition for treating a surface of a steel sheet of the present disclosure, the adhesion improver includes a backbone formed of siloxane bonds, a specific type thereof is not particularly limited, and the adhesion improver may be preferably a silicone resin. For example, the silicone resin used in the present disclosure may be obtained by polymerizing a monomer having a structural formula of $RSi(OH)_3$ (where R is an optional substituent).

A ratio of silicon dioxide in the adhesion improver may be preferably in a range of 20 mol % to 80 mol %. When the ratio of the silicon dioxide in the adhesion improver is less than 20 mol %, the storage stability of the solution may be insufficient. In the solution composition for treating a surface of a steel sheet, when the ratio of the silicon dioxide in the adhesion improver is more than 80 mol %, the adhesion of the coating layer may be deteriorated.

In addition, a weight average molecular weight of the adhesion improver is preferably in a range of 300 g/mol to 30,000 g/mol. When the weight average molecular weight of the adhesion improver is less than 300 g/mol, the adhesion may be deteriorated. In the solution composition for treating a surface of a steel sheet, when the weight average molecular weight of the adhesion improver is more than 30,000 g/mol, the compatibility with the residual solution components may be insufficient, and thus, the storage stability of the solution may be deteriorated.

The adhesion improver includes a backbone formed of siloxane bonds, and a carbon-containing substituent such as an alkyl group may be included in the backbone. In this case, since the carbon-containing substituent may provide fluidity in the solution composition, a phenomenon such as gelation does not occur even when the solution composition is in a severe environment. Thus, the compatibility of the solution composition is improved, and the respective components in the solution composition are uniformly mixed.

In the solution composition for treating a surface of a steel sheet of the present disclosure, the metal chelate curing agent serves to improve a curing level of the resin in the coating layer applied to the steel sheet and thus to improve adhesion of the coating film in a water cooling process, and may be contained in an amount of 0.1 wt % to 3.0 wt % with respect to 100 wt % of the solution composition for treating a surface of a steel sheet. When the content of the curing agent is less than 0.1 wt % with respect to 100 wt % of the solution composition for treating a surface of a steel sheet, the curing level may be insufficient, and thus, peeling of the coating film during the water cooling process after coating may occur. When the content of the curing agent is more than 3.0 wt % with respect to 100 wt % of the solution composition for treating a surface of a steel sheet, the resin may be excessively cured, and thus, the coating film may be easily broken. As a result, cracks during working may occur.

In the solution composition for treating a surface of a steel sheet of the present disclosure, a specific type of the metal chelate curing agent is not particularly limited, and the metal chelate curing agent may include one or more selected from the group consisting of metal chelates containing aluminum, titanium, zirconium, or tin, and a mixture thereof. For example, as the metal chelate curing agent containing aluminum, aluminum tris(ethylacetoacetate), aluminum tris(n-propylacetoacetate), aluminum tris(isopropylacetoacetate), aluminum tris(n-butylacetoacetate), aluminum isopropoxy bis(ethylacetoacetate), aluminum tris(acetylacetonate), aluminum tris(proponylacetonate), aluminum diisopropoxypropionylacetonate, aluminum acetylacetonatebis(propionylacetonate), aluminum monoethylacetoacetatebis(acetylacetonate), aluminum acetylacetonate-di-sec-butylate, aluminum methylacetoacetate-di-tert-butylate, aluminum bis(acetylacetonate)-mono-sec-butylate, aluminum di(methylacetoacetate)-mono-tert-butylate, and the like may be used, as the metal chelate curing agent containing titanium, diisopropoxybis(ethylacetoacetate)titanate, diisopropoxybis(acetylacetonate)titanate, di-n-butoxy-bis(acetylacetonate)titanate, and the like may be used, as the metal chelate curing agent containing zirconium, zirconium tetrakis(acetylacetonate), zirconium tetrakis(n-propylacetoacetate), zirconium tetrakis(ethylacetoacetate), and the like may be used, and as the metal chelate curing agent containing tin, dibutyltin bis(acetylacetonate) and the like may be used.

Furthermore, the present disclosure provides a method for manufacturing a surface-treated steel sheet using the solution composition.

Specifically, there is provided a method for manufacturing a surface-treated steel sheet, the method including: providing a steel sheet; subjecting at least one surface of the steel sheet to a treatment with the solution composition of the present disclosure; and subjecting the steel sheet treated with the composition to a heat treatment.

The steel sheet is not particularly limited, and for example, a cold-rolled steel sheet may be used.

Furthermore, the subjecting of the surface of the steel sheet to the treatment with the solution composition for treating a surface may be performed by coating and drying the solution composition. The coating is not particularly limited as long as a commonly used coating method may be applied. For example, methods such as roll coating, spraying, immersion, spray squeezing, and immersion squeezing may be applied, and two or more methods may be used in combination, if necessary.

Meanwhile, the heat treatment may be performed by applying a method of a hot-air drying furnace or an induction heating furnace, and the heat treatment may be performed at a temperature ranging from 150 to 550° C. based on a final reaching temperature (part metal temperature (PMT)) of a material steel sheet. When the drying temperature does not reach a temperature of 150° C. or higher based on PMT, a proper solid coating layer may not be formed and a liquid residual solution may be removed in a subsequent process, and then, desired corrosion resistance may not be secured. In addition, when the drying temperature is higher than 550° C. based on PMT, an organic resin in the coating layer may be oxidized (means that burned), such that a structure of the coating layer may be changed and desired corrosion resistance may not be secured. To this end, for example, in a case in which the drying is performed by the hot-air drying furnace, the drying may be performed by setting an internal temperature of the hot-air drying furnace to 150 to 550° C.

Furthermore, the present disclosure provides a surface-treated steel sheet including a coating layer formed of the solution composition of the present disclosure. Specifically, the present disclosure provides a surface-treated steel sheet including: a steel sheet; and a coating layer formed of the solution composition of the present disclosure, the coating layer being formed on at least one surface of the steel sheet.

The surface-treated steel sheet may have a thickness of a coating layer of 0.1 to 50 µm in a thickness after drying. When the thickness of the coating layer is less than 0.1 µm, the coating film is insufficient, and thus, the corrosion resistance is insufficient. When the thickness of the coating layer is more than 50 µm, a solid coating layer may not be formed due to insufficient drying during the coating process.

In this case, the coating layer is formed by coating and curing the solution composition of the present disclosure. A composition of a surface of the coating layer may contain 8 to 9 wt % of carbon (C), 8 to 9 wt % of oxygen (O), 10 to 15 wt % of silicon (Si), 0.5 to 1.5 wt % of manganese (Mn), and 65 to 75 wt % of iron (Fe) when measured by energy dispersive X-ray spectrometer (EDS), but the present disclosure is not limited thereto. The composition may be changed depending on specific components contained in the solution composition of the present disclosure.

Hereinafter, the present disclosure will be described in more detail with reference to specific Examples. The following Examples are only examples provided in order to assist in the understanding of the present disclosure, but the scope of the present disclosure is not limited thereto.

MODE FOR INVENTION

Examples

1. Preparation of Solution Composition for Treating Surface of Steel Sheet

In order to measure physical properties of the solution composition for treating a surface of a steel sheet of the present disclosure, a solution composition was prepared using the following materials.

Each of Ludox HAS (solid content of 30%, particle size of 12 mm, W. R. Grace & Co. -Conn.) as colloidal silica, tetraethoxysilane as alkoxy silane, ethanol as a solvent, and acetic acid as an acidity regulator was added to a container, and the mixture was stirred using a stirrer for about 5 hours while cooling the mixture so that a temperature was not higher than 50° C. At this time, the colloidal silica was surface-modified by silane, and the alkoxy silane was hydrolyzed.

Next, each of ethyl acrylate as a monomer, poly(meth) acrylic acid as an organic resin, and DC-3074 (Dow Chemical Co.) as an adhesion improver was additionally added, and the mixture was additionally stirred for about 24 hours.

Solution compositions of Examples 1 to 8 and Comparative Examples 1 to 14 were prepared by mixing the colloidal silica, the silane, the solvent, the acidity regulator, the acrylate-based monomer, the organic resin, and the adhesion improver so that the contents thereof were as described in Table 1.

TABLE 1

| Classification (wt %) | Colloidal silica | Alkoxy silane | Solvent | Acidity regulator | Monomer | Organic resin | Adhesion improver | Curing agent |
|---|---|---|---|---|---|---|---|---|
| Example 1 | 40% | 25% | 10% | 0.50% | 6.0% | 1.2% | 15% | 2.30% |
| Example 2 | 20% | 35% | 25% | 0.30% | 8.0% | 2.1% | 8% | 1.60% |
| Example 3 | 30% | 20% | 20% | 0.10% | 8.2% | 1.9% | 18% | 1.80% |
| Example 4 | 45% | 25% | 5% | 1.00% | 11.3% | 2.0% | 10% | 0.70% |

TABLE 1-continued

| Classification (wt %) | Colloidal silica | Alkoxy silane | Solvent | Acidity regulator | Monomer | Organic resin | Adhesion improver | Curing agent |
|---|---|---|---|---|---|---|---|---|
| Comparative Example 1 | 53% | 22% | 4% | 0.50% | 9.5% | 0.5% | 8% | 2.50% |
| Comparative Example 2 | 10% | 30% | 20% | 0.70% | 8.0% | 4.2% | 25% | 2.10% |
| Comparative Example 3 | 16% | 64% | 6% | 0.80% | 5.6% | 1.2% | 5% | 1.40% |
| Comparative Example 4 | 40% | 12% | 20% | 1.00% | 7.0% | 4.0% | 15% | 1.00% |
| Comparative Example 5 | 30% | 20% | 0% | 0.80% | 14.5% | 3.8% | 30% | 0.90% |
| Comparative Example 6 | 22% | 20% | 45% | 0.50% | 5.0% | 2.0% | 5% | 0.50% |
| Comparative Example 7 | 35% | 30% | 10% | 2.00% | 7.5% | 3.0% | 10% | 2.50% |
| Comparative Example 8 | 33% | 25% | 10% | 0.00% | 12.0% | 2.0% | 16% | 2.00% |
| Comparative Example 9 | 38% | 20% | 4% | 0.10% | 18.0% | 0.6% | 18% | 1.30% |
| Comparative Example 10 | 25% | 35% | 20% | 0.10% | 3.0% | 1.9% | 13% | 2.00% |
| Comparative Example 11 | 22% | 25% | 25% | 0.50% | 5.9% | 8.0% | 12% | 1.60% |
| Comparative Example 12 | 38% | 20% | 15% | 0.50% | 5.4% | 0.0% | 21% | 0.10% |
| Comparative Example 13 | 36% | 30% | 13% | 0.70% | 11.0% | 4.2% | 4% | 1.10% |
| Comparative Example 14 | 15% | 20% | 2% | 0.50% | 5.0% | 0.3% | 55% | 2.20% |
| Comparative Example 15 | 23% | 32% | 15% | 0.49% | 8.0% | 2.5% | 19% | 0.01% |
| Comparative Example 16 | 33% | 22% | 25% | 0.60% | 5.2% | 3.2% | 6% | 5.00% |
| Example 5 | 17% | 28% | 15% | 0.60% | 8.4% | 2.5% | 28% | 0.50% |
| Example 6 | 27% | 38% | 10% | 0.50% | 9.5% | 4.7% | 10% | 0.30% |
| Example 7 | 20% | 25% | 10% | 1.00% | 8.0% | 3.3% | 30% | 2.70% |
| Example 8 | 46% | 20% | 10% | 0.50% | 5.5% | 3.3% | 13% | 1.70% |

Solution Stability

In order to confirm that the stability of the solution of the prepared solution composition was maintained under certain conditions, the following experiment was performed.

After the solution compositions of Examples 1 to 8 and Comparative Examples 1 to 16 were stored in an oven at 50° C. for 72 hours and then were taken out, the solution stability was evaluated by observing the state of the solution composition. The evaluation was performed according to the following criteria. The results thereof are shown in Table 3.

<Evaluation Criteria of Solution Stability>

○: Generation of small amount of precipitates and no gelation

Δ: Generation of precipitates

X: Occurrence of gelation

2. Manufacturing of Surface-Treated Steel Sheet

Next, the prepared solution composition was bar-coated onto a surface of a steel sheet, and then, a heat treatment was performed while passing the steel sheet through an induction oven to dry and cure the solution composition. As a result, a surface-treated steel sheet was acquired. The temperatures in the heat treatment and the thicknesses of the formed coating layers when the steel sheets were subjected to the treatment with the solution compositions of Examples 1 to 8 and Comparative Examples 1 to 16 are shown in Table 2.

TABLE 2

| Classification | Coating layer thickness (μm) | Heat treatment temperature (° C.) | Used solution composition |
|---|---|---|---|
| Manufacturing Example 1 | 23 | 289 | Example 1 |
| Manufacturing Example 2 | 19 | 296 | Example 2 |
| Manufacturing Example 3 | 47 | 400 | Example 3 |
| Manufacturing Example 4 | 5 | 187 | Example 4 |
| Comparative Manufacturing Example 1 | 40 | 233 | Comparative Example 1 |
| Comparative Manufacturing Example 2 | 30 | 182 | Comparative Example 2 |
| Comparative Manufacturing Example 3 | 19 | 380 | Comparative Example 3 |
| Comparative Manufacturing Example 4 | 30 | 297 | Comparative Example 4 |
| Comparative Manufacturing Example 5 | 21 | 413 | Comparative Example 5 |
| Comparative Manufacturing Example 6 | 3 | 382 | Comparative Example 6 |
| Comparative Manufacturing Example 7 | 22 | 231 | Comparative Example 7 |

TABLE 2-continued

| Classification | Coating layer thickness (μm) | Heat treatment temperature (° C.) | Used solution composition |
|---|---|---|---|
| Comparative Manufacturing Example 8 | 42 | 394 | Comparative Example 8 |
| Comparative Manufacturing Example 9 | 15 | 226 | Comparative Example 9 |
| Comparative Manufacturing Example 10 | 41 | 342 | Comparative Example 10 |
| Comparative Manufacturing Example 11 | 18 | 178 | Comparative Example 11 |
| Comparative Manufacturing Example 12 | 13 | 258 | Comparative Example 12 |
| Comparative Manufacturing Example 13 | 13 | 256 | Comparative Example 13 |
| Comparative Manufacturing Example 14 | 47 | 213 | Comparative Example 14 |
| Comparative Manufacturing Example 15 | 12 | 220 | Comparative Example 15 |
| Comparative Manufacturing Example 16 | 8 | 300 | Comparative Example 16 |
| Comparative Manufacturing Example 17 | 57 | 276 | Example 5 |
| Comparative Manufacturing Example 18 | 0 | 388 | Example 6 |
| Comparative Manufacturing Example 19 | 44 | 120 | Example 7 |
| Comparative Manufacturing Example 20 | 40 | 580 | Example 8 |

In order to measure physical properties of the manufactured steel sheet, the sulfuric acid corrosion resistance, the working adhesion, the sulfuric acid corrosion resistance after working, the long-term corrosion resistance, the welding workability, and the water cooling adhesion were measured according to the following method and criteria.

Sulfuric Acid Corrosion Resistance

Each of the steel sheets of Manufacturing Examples 1 to 4 and Comparative Manufacturing Examples 1 to 20 was cut to a size of a diameter of 38 mm to prepare a specimen, the specimen was immersed in an aqueous solution of 50 vol % sulfuric acid maintained at 70° C. for 6 hours, and then, a corrosion loss of the specimen was measured.

<Evaluation Criteria of Sulfuric Acid Corrosion Resistance>

○: Less than 15 mg/cm$^2$/hr

Δ: 15 or more and less than 65 mg/cm$^2$/hr

X: 65 mg/cm$^2$/hr or more

Working Adhesion

Each of the steel sheets of Manufacturing Examples 1 to 4 and Comparative Manufacturing Examples 1 to 20 was cut into a size of 150 cm×75 cm (width×length) to prepare a specimen, a line was horizontally and vertically drawn on a surface of the specimen using a cross cut guide to form 100 squares with an interval of 1 mm, a portion in which the 100 squares were formed was pushed up to a height of 6 mm using an Erichsen tester, a peeling tape (NB-1, manufactured by Ichiban Co., Ltd.) was attached to the push-up portion, and whether or not the Erichsen portion was peeled off was observed while detaching the peeling tape.

<Evaluation Criteria of Working Adhesion>

○: In the case in which no peeling was observed on the surface

Δ: In the case in which the number of the surfaces on which the peeling was observed was 1 to 3 out of 100 squares X: In the case in which the number of the surfaces on which the peeling was observed was more than 3 out of 100 squares

[Sulfuric Acid Corrosion Resistance after Working]

Each of the steel sheets of Manufacturing Examples 1 to 4 and Comparative Manufacturing Examples 1 to 20 was cut into a size of a diameter of 38 mm to prepare a specimen, the specimen was worked to a height of 6 mm using an Erichsen tester, the specimen was immersed in an aqueous solution of 50 vol % sulfuric acid maintained at 70° C. for 6 hours, and then, a corrosion loss of the specimen was measured.

<Evaluation Criteria of Sulfuric Acid Corrosion Resistance after Working>

○: Less than 15 mg/cm$^2$/hr

Δ: 15 or more and less than 25 mg/cm$^2$/hr

X: 25 mg/cm$^2$/hr or more

Long-Term Corrosion Resistance

Each of the steel sheets of Manufacturing Examples 1 to 4 and Comparative Manufacturing Examples 1 to 20 was cut into a size of a diameter of 38 mm to prepare a specimen, the specimen was immersed in an aqueous solution of 50 vol % sulfuric acid maintained at 70° C. for 96 hours, and then, a corrosion loss of the specimen was measured. The thinnest thickness of the specimen after the corrosion compared to the initial thickness was measured and expressed as %.

<Evaluation Criteria of Long-Term Corrosion Resistance>

○: 25% or more of initial thickness

Δ: 8% or more and less than 25% of initial thickness

X: Less than 8% of initial thickness

Welding Workability

Each of the steel sheets of Manufacturing Examples 1 to 4 and Comparative Manufacturing Examples 1 to 20 was cut into a size of 30 cm×10 cm (width×length) to prepare a specimen, and the amount of gas (fume) generated during welding was observed while welding the specimen through gas metal arc welding.

<Evaluation Criteria of Welding Workability>

○: No generation of fume

X: Generation of large amount of fume

Water Cooling Adhesion

Immediately after passing each of the steel sheets of Manufacturing Examples 1 to 4 and Comparative Manufacturing Examples 1 to 20 through an induction oven, cooling water was sprayed in a state in which the steel sheet was still hot, and the amount of peeling of the film from the surface of the steel sheet was observed.

<Evaluation Criteria of Water Cooling Adhesion>

○: Occurrence of no peeling of coating film

X: Occurrence of peeling of coating film

The measurement results of the physical properties of the steel sheets of Manufacturing Examples 1 to 4 and Comparative Manufacturing Examples 1 to 20 are shown in Table 3.

TABLE 3

| Classification | Stability of solution composition | Sulfuric acid corrosion resistance | Working adhesion | Sulfuric acid corrosion resistance after working | Long-term corrosion resistance | Welding workability | Water cooling adhesion | Used solution composition |
|---|---|---|---|---|---|---|---|---|
| Manufacturing Example 1 | ○ | ○ | ○ | ○ | ○ | ○ | ○ | Example 1 |
| Manufacturing Example 2 | ○ | ○ | ○ | ○ | ○ | ○ | ○ | Example 2 |
| Manufacturing Example 3 | ○ | ○ | ○ | ○ | ○ | ○ | ○ | Example 3 |
| Manufacturing Example 4 | ○ | ○ | ○ | ○ | ○ | ○ | ○ | Example 4 |
| Comparative Manufacturing Example 1 | ○ | X | X | X | X | ○ | ○ | Comparative Example 1 |
| Comparative Manufacturing Example 2 | ○ | X | X | X | X | ○ | ○ | Comparative Example 2 |
| Comparative Manufacturing Example 3 | ○ | X | ○ | X | X | ○ | ○ | Comparative Example 3 |
| Comparative Manufacturing Example 4 | ○ | X | ○ | X | X | ○ | ○ | Comparative Example 4 |
| Comparative Manufacturing Example 5 | X | X | X | X | X | ○ | ○ | Comparative Example 5 |
| Comparative Manufacturing Example 6 | X | X | ○ | X | X | ○ | ○ | Comparative Example 6 |
| Comparative Manufacturing Example 7 | X | X | X | X | X | ○ | ○ | Comparative Example 7 |
| Comparative Manufacturing Example 8 | X | X | X | X | X | ○ | ○ | Comparative Example 8 |
| Comparative Manufacturing Example 9 | ○ | X | ○ | X | X | ○ | ○ | Comparative Example 9 |
| Comparative Manufacturing Example 10 | ○ | X | ○ | X | X | ○ | ○ | Comparative Example 10 |
| Comparative Manufacturing Example 11 | ○ | X | ○ | X | X | ○ | ○ | Comparative Example 11 |
| Comparative Manufacturing Example 12 | ○ | X | ○ | X | X | ○ | ○ | Comparative Example 12 |
| Comparative Manufacturing Example 13 | ○ | ○ | X | X | ○ | ○ | ○ | Comparative Example 13 |
| Comparative Manufacturing Example 14 | ○ | ○ | ○ | ○ | X | X | ○ | Comparative Example 14 |
| Comparative Manufacturing Example 15 | ○ | ○ | ○ | ○ | ○ | ○ | X | Comparative Example 15 |
| Comparative Manufacturing Example 16 | ○ | ○ | X | ○ | ○ | ○ | ○ | Comparative Example 16 |
| Comparative Manufacturing Example 17 | ○ | ○ | ○ | ○ | ○ | X | ○ | Example 5 |
| Comparative Manufacturing Example 18 | ○ | X | X | Δ | ○ | ○ | ○ | Example 6 |
| Comparative Manufacturing Example 19 | ○ | X | X | X | X | ○ | ○ | Example 7 |
| Comparative Manufacturing Example 20 | ○ | X | X | X | X | ○ | ○ | Example 8 |

As shown in Table 3, in the cases of the steel sheets of Manufacturing Examples 1 to 4 which were the steel sheets treated with the solution compositions of Examples 1 to 4, it could be confirmed that the solution stability, the sulfuric acid corrosion resistance, the working adhesion, the sulfuric acid corrosion resistance after working, the long-term corrosion resistance, the welding workability were significantly excellent. In addition, it could be confirmed that surface defects such as a boiling phenomenon did not occur during the coating and drying process, and the significantly excellent surface quality was thus secured.

However, in the case of Comparative Manufacturing Example 1, it could be confirmed that the content of the colloidal silica added was excessive and a large amount of residual silica remained in the reaction with silane, formation of a coating layer was thus inhibited, and as a result, the sulfuric acid corrosion resistance, the working adhesion, the sulfuric acid corrosion resistance after working, and the long-term corrosion resistance were significantly deteriorated.

In the case of Comparative Manufacturing Example 2, it could be confirmed that the colloidal silica did not sufficiently bind to silane due to an insufficient content thereof, and thus, the sulfuric acid corrosion resistance, the working adhesion, the sulfuric acid corrosion resistance after working, and the long-term corrosion resistance were significantly deteriorated.

In the case of Comparative Manufacturing Example 3, it could be confirmed that an excessive amount of silane was added, an organic gas due to thermal decomposition was thus discharged during the process of preparing the solution composition, and the sulfuric acid corrosion resistance after coating, the sulfuric acid corrosion resistance after working, and the long-term corrosion resistance were deteriorated due to a large amount of residual silane.

In the case of Comparative Manufacturing Example 4, it could be confirmed that the silane did not sufficiently bind to silica due to an insufficient content thereof, a proper coating film was thus not formed, and as a result, the sulfuric acid corrosion resistance after coating, the sulfuric acid corrosion resistance after working, and the long-term corrosion resistance were deteriorated.

In the case of Comparative Manufacturing Example 5, it could be confirmed that a proper solution was not prepared due to an insufficient solvent (insufficient solution stability), a proper coating film was not formed as shown in Comparative Manufacturing Example 5 even when the solution was prepared and coated, and thus, the sulfuric acid corrosion resistance after coating, the working adhesion, the sulfuric acid corrosion resistance after working, and the long-term corrosion resistance were deteriorated.

In the case of Comparative Manufacturing Example 6, it could be confirmed that a proper solution was not prepared because an excessive amount of the solvent was contained (insufficient solution stability), a proper coating film was not formed as shown in Comparative Manufacturing Example 6 even when the solution was prepared and coated, and thus, the sulfuric acid corrosion resistance after coating, the sulfuric acid corrosion resistance after working, and the long-term corrosion resistance were deteriorated.

In the case of Comparative Manufacturing Example 7, it could be confirmed that a weight average molecular weight of the organic and inorganic mixed resin of silica modified with silane, a monomer, and an organic resin was excessively increased because an excessive amount of the acidity regulator was added, gelation of the solution occurred (insufficient solution stability), and thus, the sulfuric acid corrosion resistance, the working adhesion, the sulfuric acid corrosion resistance after working, and the long-term corrosion resistance were deteriorated even when the coating was performed as shown in Comparative Manufacturing Example 7.

In the case of Comparative Manufacturing Example 8, it could be confirmed that the hydrolysis time was increased and the solution stability was insufficient due to an insufficient content of the acidity regulator, a normal film was not formed due to partial gelation during coating as shown in Comparative Manufacturing Example 8, and thus, the sulfuric acid corrosion resistance, the working adhesion, the sulfuric acid corrosion resistance after working, and the long-term resistance were deteriorated.

In the case of Comparative Manufacturing Example 9, it could be confirmed that unreacted monomers remained because an excessive amount of the monomer was added, and thus, the sulfuric acid corrosion resistance, the sulfuric acid corrosion resistance after working, and the long-term resistance were deteriorated.

In the case of Comparative Manufacturing Example 10, it could be confirmed that a sufficient bond between nanosilica and a silane composite was not formed due to an insufficient content of the monomer, and thus, the sulfuric acid corrosion resistance, the sulfuric acid corrosion resistance after working, and the long-term resistance were deteriorated.

In the case of Comparative Manufacturing Example 11, it could be confirmed that a curing level of the coating layer was reduced because an excessive amount of the organic resin was added, and thus, the sulfuric acid corrosion resistance, the sulfuric acid corrosion resistance after working, and the long-term resistance were deteriorated.

In the case of Comparative Manufacturing Example 12, it could be confirmed that the sulfuric acid corrosion resistance, the sulfuric acid corrosion resistance after working, and the long-term resistance were deteriorated due to an insufficient content of the organic resin.

In the case of Comparative Manufacturing Example 13, it could be confirmed that the working adhesion and the sulfuric acid corrosion resistance after working were deteriorated due to an insufficient content of the adhesion improver.

In the case of Comparative Manufacturing Example 14, it could be confirmed that the long-term corrosion resistance was deteriorated because an excessive amount of the adhesion improver was added, and the welding workability was deteriorated due to generation of a large amount of gas (fume) during welding.

In the case of Comparative Manufacturing Example 15, it could be confirmed that the resin was not sufficiently cured due to an insufficient content of the curing agent, and thus, the water cooling adhesion was deteriorated.

In the case of Comparative Manufacturing Example 16, it could be confirmed that the coating layer was easily brittle due to excessive curing caused by an excessive content of the curing agent, and thus, the working adhesion was deteriorated.

In the case of Comparative Manufacturing Example 17, it could be confirmed that the thickness of the coating layer was larger than an appropriate thickness, a large amount of gas (fume) was thus generated during welding, and as a result, the welding workability was deteriorated and internal cracks were generated after welding.

In the case of Comparative Manufacturing Example 18, it could be confirmed that a coating layer was not formed, and thus, the sulfuric acid corrosion resistance and the working adhesion were deteriorated.

In the case of Comparative Manufacturing Example 19, it could be confirmed that a normal coating layer was not formed due to a low drying temperature of the coating film, and thus, the sulfuric acid corrosion resistance, the working adhesion, the sulfuric acid corrosion resistance after working, and the long-term corrosion resistance were insufficient.

In the case of Comparative Manufacturing Example 20, it could be confirmed that the organic components in the coating layer were carbonized due to an excessively high drying temperature of the coating film, and thus, the sulfuric acid corrosion resistance, the working adhesion, the sulfuric acid corrosion resistance after working, and the long-term corrosion resistance were deteriorated.

Next, a solution composition was prepared with the component contents of Example 1, but the solution was prepared by changing a molar ratio of silicon dioxide and a weight average molecular weight of a silicone resin, which was used as an adhesion improver, as shown in Table 4, solution stability was evaluated, and working adhesion when a specimen was prepared by coating the solution to a steel sheet was measured.

TABLE 4

| Classification | SiO₂ ratio (mol %) | Weight average molecular weight (g/mol) |
| --- | --- | --- |
| Example 1-1 | 65% | 4,400 |
| Example 1-2 | 55% | 28,000 |
| Example 1-3 | 30% | 800 |
| Example 1-4 | 75% | 12,000 |
| Comparative Example 1-1 | 95% | 6,500 |
| Comparative Example 1-2 | 12% | 26,500 |
| Comparative Example 1-3 | 69% | 36,400 |
| Comparative Example 1-4 | 27% | 180 |

The measurement results of the solution stabilities of the solution compositions of Examples 1-1 to 1-4 and Comparative Examples 1-1 to 1-4 and the physical properties of the steel sheets whose surfaces are treated using the same are shown in Table 5. At this time, the measurement was performed in the same manner as that of Manufacturing Example 1 in terms of the thickness and the temperature in the heat treatment of the coating layer.

TABLE 5

| Classification | Working adhesion | Solution stability | Used solution composition |
| --- | --- | --- | --- |
| Manufacturing Example 1-1 | ○ | ○ | Example 1-1 |
| Manufacturing Example 1-2 | ○ | ○ | Example 1-2 |
| Manufacturing Example 1-3 | ○ | ○ | Example 1-3 |
| Manufacturing Example 1-4 | ○ | ○ | Example 1-4 |
| Comparative Manufacturing Example 1-1 | X | ○ | Comparative Example 1-1 |
| Comparative Manufacturing Example 1-2 | X | X | Comparative Example 1-2 |
| Comparative Manufacturing Example 1-3 | X | X | Comparative Example 1-3 |
| Comparative Manufacturing Example 1-4 | X | ○ | Comparative Example 1-4 |

As shown in Table 5, in the cases of Examples 1-1 and 1-4, it could be confirmed that the solution stability was excellent, and the working adhesion when the surface of the steel sheet was treated with the solution composition was also significantly excellent.

However, in the case of Comparative Manufacturing Example 1-1, it could be confirmed that the working adhesion was deteriorated because the molar ratio of the silicon dioxide in the adhesion improver was excessively high.

In the case of Comparative Manufacturing Example 1-2, it could be confirmed that the compatibility with the resin prepared using colloidal silica and silane was insufficient due to an insufficient molar ratio of the silicon dioxide in the adhesion improver, and thus, the solution stability after preparation of the solution was insufficient, and the working adhesion was insufficient even when the solution composition was coated to a steel sheet.

In the case of Comparative Manufacturing Example 1-3, it could be confirmed that the weight average molecular weight of the adhesion improver was excessively high, and thus, the solution stability was deteriorated, and the working adhesion was insufficient even when the solution composition was coated to a steel sheet.

In the case of Comparative Manufacturing Example 1-4, it could be confirmed that the weight average molecular weight of the adhesion improver was excessively low, a significant amount of the adhesion improver was volatilized together with the solvent during the coating process, and thus, the working adhesion of the coated steel sheet was insufficient.

Although exemplary embodiments in the present disclosure have been described in detail above, it will be apparent to those skilled in the art that the scope of the present disclosure is not limited thereto, but modifications and variations could be made without departing from the technical idea of the present disclosure described in the claims.

The invention claimed is:

1. A solution composition for treating a surface of a steel sheet comprising:
    15 to 50 wt % of colloidal silica;
    20 to 60 wt % of alkoxy silane;
    1 to 40 wt % of a solvent;
    0.01 to 1.00 wt % of an acidity regulator;
    5 to 15 wt % of an acrylate-based monomer;
    0.1 to 3.0 wt % of a metal chelate curing agent; and
    5 to 50 wt % of an adhesion improver including a backbone formed of siloxane bonds,
    wherein the adhesion improver is a silicone resin,
    wherein a ratio of silicon dioxide in the adhesion improver is 20 to 80 mol %, and
    wherein a weight average molecular weight of the adhesion improver is 300 g/mol to 30,000 g/mol.

2. The solution composition for treating a surface of a steel sheet of claim 1, wherein a particle size of the colloidal silica is 5 nm to 50 nm.

3. The solution composition for treating a surface of a steel sheet of claim 1, wherein the alkoxy silane includes three or more alkoxy groups, and is one or more selected from the group consisting of vinyl trimethoxy silane, vinyl triethoxy silane, vinyl tri-isopropoxy silane, 3-methacryloxypropyl trimethoxy silane, 2-glycidyloxy propyltrimethoxy silane, 2-glycidyloxy propyltriethoxy silane, 2-aminopropyl triethoxy silane, 2-ureidoalkyl triethoxy silane, tetraethoxysilane, triethoxyphenylsilane, and trimethoxyphenylsilane.

4. The solution composition for treating a surface of a steel sheet of claim 1, wherein the solvent is one or more selected from the group consisting of methanol, ethanol, 2-propanol, 2-methoxypropanol, 2-butoxyethanol, water, dimethylformamide, diglyme, 2-aminoethanol, 1-heptanol, propylene glycol, dimethyl sulfoxide, ethylene glycol, diethylene glycol, glycerin, di(propylene glycol) methyl ether, diethylene glycol monomethyl ether, ethylene glycol mono-n-propyl ether, propylene glycol monomethyl ether, and propylene glycol monomethyl ether acetate.

5. The solution composition for treating a surface of a steel sheet of claim 1, wherein the acidity regulator is an organic acid, an inorganic acid, or a mixed acid thereof.

6. The solution composition for treating a surface of a steel sheet of claim 1, wherein the acrylate-based monomer is at least one selected from the group consisting of acrylic acid glacial, methyl acrylate, ethyl acrylate, butyl acrylate, 2-ethylhexyl acrylate, isobutyl acrylate, tertiary-butyl acrylate, tertiary-butyl methacrylate, butanediol monoacrylate, lauryl acrylate, dimethylaminoethyl acrylate, and dihydrodicyclopentadienyl acrylate.

7. The solution composition for treating a surface of a steel sheet of claim 1, wherein the metal chelate contains one or more selected from the group consisting of metal chelates containing aluminum, titanium, zirconium, or tin, and a mixture thereof.

8. The solution composition for treating a surface of a steel sheet of claim 1, further comprising 0.1 to 5.0 wt % of an organic resin, wherein the organic resin is at least one selected from the group consisting of polyvinyl alcohol, poly(meth)acrylic acid, a copolymer of acrylic acid and methacrylic acid, a copolymer of ethylene and an acrylic monomer, a copolymer of ethylene and vinyl acetate, polyurethane, an amino-modified phenolic resin, a polyester resin, and an epoxy resin.

9. A method for manufacturing a surface-treated steel sheet, the method comprising:
providing a steel sheet;
subjecting the steel sheet to a treatment with the composition of claim 1; and
subjecting the steel sheet treated with the composition to a heat treatment.

10. The method for manufacturing a surface-treated steel sheet of claim 9, wherein the heat treatment is performed at 150 to 550° C.

11. A surface-treated steel sheet comprising:
a steel sheet; and
a coating layer formed of the composition of claim 1, the coating layer being formed on the steel sheet.

12. The surface-treated steel sheet of claim 11, wherein a thickness of the coating layer is 5 to 55 µm.

* * * * *